United States Patent [19]
Kagayama

[11] 4,201,448
[45] May 6, 1980

[54] REFLECTOR FOR SPOKEWISE WHEELS

[75] Inventor: Joe Kagayama, Osaka, Japan

[73] Assignee: Tsuyama Manufacturing Company, Ltd., Osaka, Japan

[21] Appl. No.: 928,851

[22] Filed: Jul. 28, 1978

[51] Int. Cl.$^2$ ............................................... G02B 5/12
[52] U.S. Cl. ................................. 350/99; 301/37 SA; 350/97
[58] Field of Search ................... 350/97–105; 301/37 SA; 40/129

[56] References Cited

U.S. PATENT DOCUMENTS

| 2,759,396 | 8/1956 | Clune | 350/99 |
| 3,947,070 | 3/1976 | Brilando et al. | 301/37 SA |
| 4,017,151 | 4/1977 | Kagayama | 350/99 |
| 4,037,924 | 7/1977 | May | 350/99 |

*Primary Examiner*—John K. Corbin
*Assistant Examiner*—B. Wm. de los Reyes

*Attorney, Agent, or Firm*—Allegretti, Newitt, Witcoff & McAndrews

[57] ABSTRACT

This invention provides a reflector adapted to be mounted on the spokes of a spokewise bicycle wheel or the like, such reflector including a plate-like reflector body having reflective surfaces each provided with reflective zones capable of reflecting incident light in generally parallel relation thereto. This reflector further comprises a through hole relative to said reflective surfaces, a nut portion which is coaxially movable in the through hole, a hook member, a bolt portion affixed to said nut portion, a fixing means and a rotation-restraining means. The hook member is integrally formed with one end face of said nut portion and extends therefrom in the axial direction. The bolt portion is provided for firmly pressing a spoke against the inside face of said hook member. The fixing means is provided for retaining the bolt portion on its opposite side through the through hole in a state where the spoke is firmly pressed against the inside face of the hook member and the spoke is in abutting engagement with the reflector.

3 Claims, 8 Drawing Figures

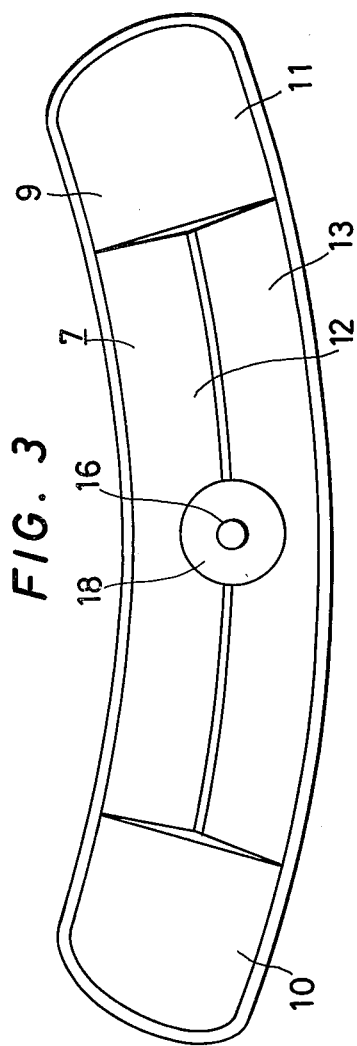
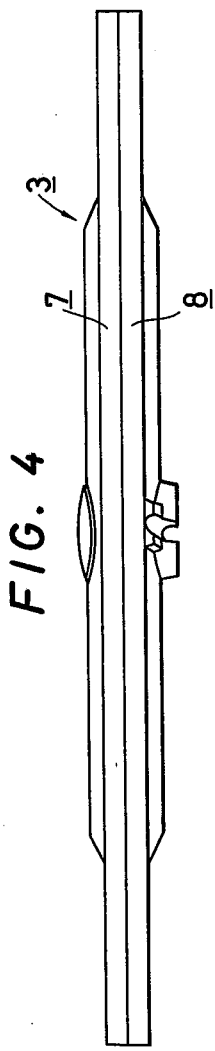
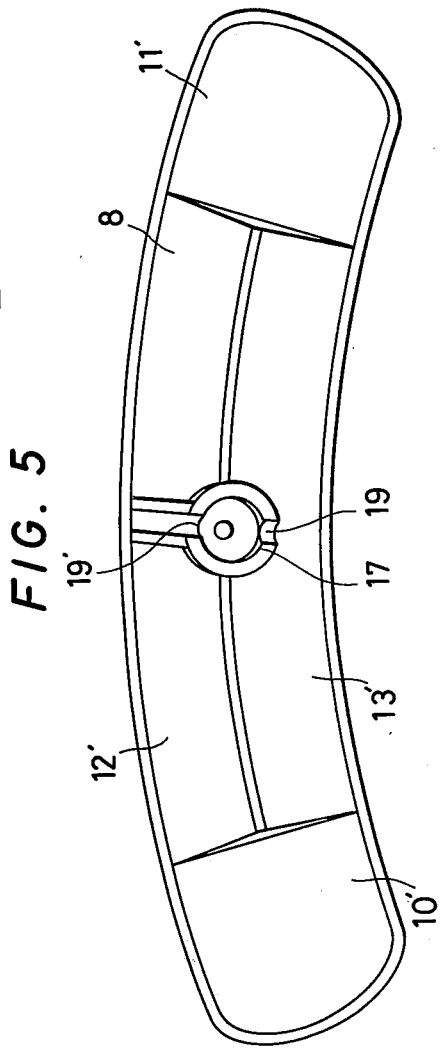
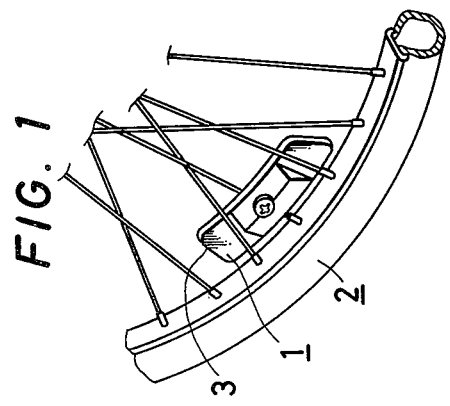
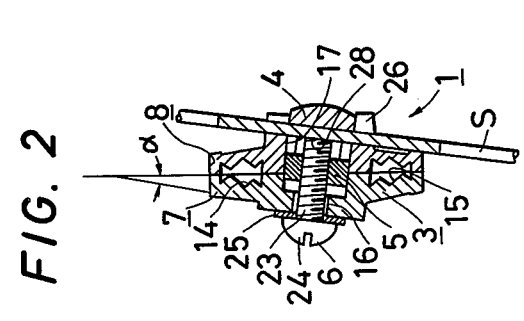

REFLECTOR FOR SPOKEWISE WHEELS

BACKGROUND OF THE INVENTION

In general, a plate-like reflector is mounted on the body of a bicycle, motor cycle or like vehicle for assuring safe cycling. This is because the presence of a vehicle provided with such a plate-like reflector can easily be ascertained by another vehicle through the reflection of its own light. In particular, mounting of such a reflector is greatly effective in assuring safe cycling at night.

Incidentally, it is possible to mount the plate-like reflector on the respective parts of a vehicle in such a manner that rotational movement is provided to the reflected light. This ensures that the reflected light is well ascertained. Accordingly, in most cases the plate-like reflector is mounted on a wheel. In case of a spokewise wheel, the plate-like reflector is mounted on spokes. In order to mount the reflector on the spokes, several methods have been known in the art.

According to one method, a plastic or metallic plate is screwed to the plate-like reflector through some spokes. However, the force for fixing the spokes in position is entirely applied to the plate-like reflector. When the plate-like reflector is formed from plastics, its mechanical strength structurally suffers a reduction and the force for fixing the spokes in position is limited. In addition, each spoke is very thin and has a small pressure-receiving area, and continuous vibrating load is exerted thereon for long periods of time. This caused that the fixation was apt to get loose, resulting in scattering of the reflected light and accurate ascertainment of a vehicle being rendered difficult. Furthermore, there was a fear that if the plate-like reflector per se was dislodged, thus causing traffic accidents etc.

According to another method, the plate-like reflector is provided on its surface with a projecting tapped hole, and the tapped hole is provided at its extremity with a groove. A bolt is fitted into the tapped hole such that the spoke is in pressure engagement with the groove. Like the first method, this method also causes the entire force for fixing the spoke in position to be applied to the plate-like reflector.

According to a further method, a resilient locking portion is integrally formed with the plate-like reflector which, in turn, is fitted to the spoke by locking the spoke to the resilient locking portion in resilient fashion. This method has the same disadvantage as the foregoing methods. In addition, it was found that the plate-like reflector loosens largely on the spoke due to vibrations since the former is resiliently locked to the latter. Taking the deterioration of plastics (the change with time) into consideration, this method is not preferred.

According to a still further method, use is made of a cap nut having a divided groove. This cap nut has a groove divided (two-divided) from the opening side of a tapped hole. The width of the divided groove is such that the spoke is insertable therein, and the depth thereof reaches the bottom of the tapped hole. The spoke is inserted into this divided groove, and is subsequently inserted into one end of a through hole in the plate-like reflector from the opening side of the tapped hole. A bolt corresponding to the tapped hole in the cap nut is fitted into the other end of the through hole to keep the cap nut in tensioned condition, whereby the plate-like reflector is fixed to the spoke. Thus, since the fixing force of the spoke is directly applied to the plate-like reflector, this method is disadvantageous in that the fixing force is limited as in the foregoing methods. In addition, it is required to separately arrange the three parts, i.e., the plate-like reflector, the cap nut and the bolt until they are mounted on the spoke and their mounting operations are also troublesome.

As a consequence of extensive investigations carried out with a view to eliminating the aforesaid problems, the present inventor has found a novel means for indirectly fixing a plate-like reflector to spokes without the need of directly fixing the former to the latter.

SUMMARY OF THE INVENTION

Thus, an object of the present invention is to provide a means for permitting firm clamping and securing of a spoke by virtue of a spoke clamping member formed of tough material. Another object of the present invention is to provide a means for fixing the spoke clamping the plate-like reflector and the spoke clamping member to the plate-like reflector in abutting relation thereto with a somewhat less force (a force that the plate-like reflector can withstand).

A main constructional feature of the reflector for spokewise wheels according to the present invention resides in the provision of a nut portion, a hook member formed integrally with one end face of said nut portion and extending therefrom in the axial direction and a bolt portion bonded to said nut portion and designed to firmly press the spoke against the inside face of a hooking portion of the hook member by means of the extremity of a screw axis. Another feature of the present invention resides in the provision of a fixing means for retaining said bolt portion on its opposite side through a through hole in the plate-like reflector in a state where the spoke is firmly pressed against the inside face of the hooking portion of the hook member and is in abutting engagement with the reflector and a means for restraining rotation of the reflector.

By taking advantage of these features, the present invention renders it possible to securely mount the plate-like reflector on the spokes without applying a force of larger magnitude thereto, thus preventing the reflector from loosening on the spoke and suffering damage even when it is subjected to continuous vibrating and impact loads for long periods of time. Furthermore, the present invention facilitates mounting of the reflector on the spokes.

BRIEF DESCRIPTION OF THE DRAWING

There are shown in the attached drawing preferred embodiments of the present invention wherein:

FIG. 1 is a perspective view showing one embodiment of the reflector for a spokewise wheel according to the present invention during use, FIG. 2 is a longitudinal section view taken along the center thereof, FIG. 3 is a view showing the surface of the reflector, FIG. 4 is a side view thereof, FIG. 5 is a rear view thereof.

DETAILED DESCRIPTION OF THE INVENTION

Figure 7:
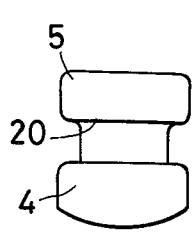
FIG. 7 is a side view thereof.

The present invention relates to a reflector for a spokewise wheel including a plate-like reflector body having reflective surfaces each provided with reflective zones capable of reflecting incident light in generally parallel relation thereto, characterized by comprising a through hole relative to said reflective surfaces, a nut portion which is coaxially movable in the through hole, a hook member formed integrally with one end face of said not portion and extending therefrom in the axial direction, a bolt portion bonded to said nut portion and adapted to firmly press a spoke against the inside face of said hook member by virtue of the extremity of a screw axis, a fixng means for retaining the bolt portion on its opposite side through said through hole in a state where the spoke is firmly pressed against the inside face of said hook member and the spoke is in abutting engagement with the reflector, and a rotation-restraining means for preventing rotation of said plate-like reflector body within the reflective surfaces.

In this specification, the term "a hook member" is used to indicate a means formed integrally with one end face of the nut portion and extending therefrom in the axial direction, the inside face of which can be in engagement with a spoke. It will be understood that the extremity of the hooking portion of the hook member must have a space sufficient to permit passage of a spoke between the reflective surfaces provided on the plate-like reflector during the mounting operation of the reflector.

In this specification, the term "a fixing means" is used to indicate a means for retaining the bolt portion on its opposite side through the plate-like reflector, said bolt portion being firmly pressed against the inside face of the hooking portion of the hook member. According to its concrete example, a head is provided to the bolt portion, and a resilient washer, preferably a spring washer is inserted in between the peripheral edge of the through hole in the plate-like reflector and the head of the bolt portion. It will be understood that the fixing means can be constructed from only the head of the bolt portion with the elastic forces of the spoke and reflector etc. under satisfactory dimension controls. Furthermore, if a headless bolt is employed as the bolt portion, its nut or the nut and washer can act as the fixing means.

In this specification, the term "a rotation-restraining means" is used to indicate a means for preventing rotation of the plate-like reflector relative to the spoke within the reflective surfaces. This means is achieved by the non-rotative engagement of the plate-like reflector to the spoke or the nut portion, hook member or bolt portion in strongly bonded relation to the spoke. This engagement may, of course, be either direct or indirect. As the concrete rotation-restraining means, there can be mentioned a groove provided in the reflective surface of the plate-like reflector, into which the spoke is to be inserted. Alternatively, the cross section perpendicular to the axis arranged such that the nut portion and hook member are non-rotative with respect to the through hole in the plate-like reflector may be formed into a non-rotative shape. The former method involving the provision of a groove is disadvantageous in that such a groove causes a drop of the mechanical strength of the entire plate-like reflector. However, although it is difficult to increase the thickness of the reflector since a drop in reflectivity is brought about, this defect in connection with strength can sufficiently be obviated since the lateral size of this reflector is of greater magnitude in comparison with the vertical size and the reflectivity is not adversely affected.

The plate-like reflector used in the present invention may be optionally selected from those used in spokewise wheels. A preferred plate-like reflector is provided with reflective surfaces each having at least three reflective zones. Two reflective zones each are provided with reflector elements with their optical axis being symmetrical with one another and being inclined with respect to their surfaces thereby to render wide angle reflection possible, and the remaining one reflective zone is provided with reflector elements with their optical axes being disposed perpendicularly to their surfaces thereby to render standard reflection possible.

The present invention will now be illustrated in detail with reference to embodiments shown in the drawing; however, the instant invention is not limited thereto.

With reference to FIGS. 1 and 2, numeral 1 denotes a reflector mounted on a spokewise wheel 2, which is mainly constructed from a plate-like reflector body 3, a hook member 4 for hooking a spoke, a nut portion 5 formed integrally with said member and a bolt portion 6 therefore.

As shown in FIGS. 2 to 5, the plate-like reflector body 3 comprises a front reflector member 7 and a rear reflector member 8 which are sealed together as by ultrasonic welding. The front reflector member 7 is a plate-like member having the substantially same height and with a relatively large curvature corresponding to the wheel 2, and is formed of acrylic resin by injection molding. This front reflector member 7 is provided in its reflective surface 9 with four reflective zones 10, 11, 12 and 13. The reflective zones 10 and 11 on both ends are horizontally symmetrical with each front surface being generally flat and each back surface having a number of reflector elements 14, 15—in a regular triangular pyramid form with their optical axis being normal to their surfaces. Consequently, the respective reflecting zones 10 and 11 each have the ability to reflect incident light in generally parallel relation thereto, i.e., render the so-called standard reflection possible. On the other hand, the reflective zones 12 and 13 are vertically symmetrical with each front surface being generally flat but inclined by an angle $\alpha = $ about $\pm 10°$ with respect to the front surface of each reflective zone 12 or 13. Each reflective zone 12 or 13 is provided on its back surface with a number of reflector elements in a regular triangular pyramid form with their optical axis being inclined by about 20° with respect to their front surfaces. Consequently, the respective reflective zones 12 and 13 each have the ability to reflect incident light in generally parallel relation thereto, i.e., render the so-called wide angle reflection possible. Furthermore, this front reflector member is provided in its central portion with a through hole 16. This through hole is hereinafter referred to as the reduced diameter portion in connection with a through hole 17 in the rear reflector member 8 to be described later. This reduced diameter portion 16 has a front opening portion projecting from the surface of the reflector body. The end face of this opening 18 is inclined such that, when the plate-like reflector body 3 is mounted on the spoke S, the front surfaces of the reflective zones 10 and 11 are held perpendicularly. It will be understood that this angle of inclination is determined in connection with the inclination of the spoke S.

A detailed explanation on the rear reflector member 8 is omitted since it has the generally same reflective zones as the aforesaid reflector member 7. The through hole 17 in the central portion which is designed to be larger in diameter and to be formed coaxially in connection with the aforesaid reduced diameter portion 16, is hereinafter referred to as the enlarged diameter portion. A front opening portion 26 of this enlarged diameter portion projects from the surface of the reflector body and is provided with recessed grooves 19 and 19' acting as the rotation-restraining means, which grooves can be in engagement with the spoke S. It will be understood that the bottom of these grooves are inclined such that, when the reflector body 3 is mounted on the spoke S, the surface of the reflective zones 10 and 11 are held perpendicularly.

Figure 6:
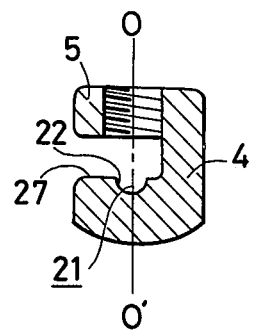
FIG. 6 is a section view showing the nut portion and hook member.
Figure 8:
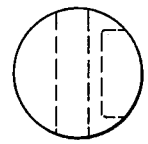
FIG. 8 is a rear view thereof.

With reference to FIGS. 6 to 8, the aforesaid hook member 4 is integrally formed with one end face of the nut portion 5 and extends therefrom the axial direction (O→O'). This member is provided on its inside face with a groove 22 into which the spoke S is to be inserted. Numeral 27 denotes the extremity of the hooking portion.

The aforesaid bolt portion 6 is fitted into the nut portion 5. The bolt portion 6 comprises a bolt head 24, a screw portion 23 and an extremity 28. A spring washer 25 is disposed between bolt head 24 and the adjacent surface of the reflector body.

Incidentally, the nut portion 5 and the hook member 4 are coaxially movable within the enlarged diameter portion 17 of the through hole in the aforesaid plate-like reflector body 3, and the bolt portion 6 has its screw portion 23 designed to be insertable into the reduced diameter portion 16.

One method for mounting the thus constructed reflector 1 on the spoke S of the wheel 2 of a bicycle will now be explained.

First, the nut portion 5 and the hook member 4 which are integrally formed with each other are coaxially inserted into the enlarged diameter portion of the through hole in the plate-like reflector body 3 in that order, and a partial extremity of the screw portion 23 is screwed from the reduced diameter portion 16 through the bolt portion 6 to the nut portion 5. At this tentative coupling state, the extremity 27 of the hook member 4 is caused to project outwardly from the surface of the enlarged diameter portion side of the plate-like reflector body 3, i.e., the surface of the front opening portion 20, so that the spoke S can easily be inserted into the space thus defined.

After the spoke S is inserted into the groove 22 in the inside surface 21 of the hook member through the aforesaid space, the bolt portion 6 is threaded therein to firmly press the spoke S against the groove 22 by means of the extremity 28 of the screw portion 23. In this case, it will be understood that the spoke S is in engagement with the recessed grooves 19 and 19' in the front opening of the enlarged diameter portion. On the other hand, the bolt head 24 is pressed against the plate-like reflector body 3 through the spring washer 25. That is to say, the plate-like reflector body 3 is resiliently clamped by the spoke S and the spring washer 25.

As above mentioned, the nut portion 5, hook member 4 and bolt portion 6 is strongly coupled to the spoke S. Furthermore, in this state the nut portion 5, hook member 4 and bolt portion 6 are resiliently coupled to the spoke S such that the plate-like reflector body 3 is clamped therebetween. Hence, the main fixing force for securing the plate-like reflector body to the spoke S in tensioned fashion is attained by the clamping forces exerted by the hook member 4 and the extremity of the bolt 6. Furthermore, since the auxiliary fixing force produced by the aforesaid resilient coupling action is attained in addition to the main fixing force, the reflector 1 can firmly be mounted on the spoke S in such a manner that the former does not loosen on the latter. In addition, the force which is directly applied to the reflector 1 is only the auxiliary fixing force produced by the resilient coupling action. This ensures that so severe force is exerted on the reflector, resulting in prevention of changes in the physical properties of the reflector as well as deterioration and failure thereof for long periods of time. Also, it is unlikely that the reflector 1 loosens on the spoke S due to its rotation. Furthermore, since the through hole is provided with the reduced diameter portion 16, the nut portion 5, hook member 4 and bolt portion 6 can tentatively be coupled in advance to the plate-like reflector body 3. This ensures that it is easy to keep the required components in given preparatory conditions, and that it is easy to mount the reflector on the spoke S.

Since the spoke is generally 1.8 to 4.0 mm in diameter, it is preferred that the cross section of each recessed groove 19 or 19' formed in the rear reflector member 8 of the plate-like reflector body 3 is determined corresponding to the larger value. This is because the groove can be adapted in common to all spokes. It will be understood that the length of the screw portion 23 of the bolt portion may virtually be determined regardless of the diameter of the spoke since the nut portion 5 and hook member 4 permit the enlarged diameter portion to be movable in the axial direction. Thus, the reflector according to the present invention can be mounted on the spokes of a bicycle, motor cycle or like vehicle; hence, the reflector can find its use in a wider range of fields, thus bringing economical benefits to the public. While there have been described preferred embodiments of the present invention, it will be obvious that other embodiments will be apparent to those skilled in the art. It is, therefore, intended that the invention be limited only within the scope of the appended claims.

What is claimed is:

1. A reflector for a wheel including a plurality of spokes, said reflector including a plate-like reflector body having reflective surfaces each provided with reflective zones capable of reflecting incident light in generally parallel relation thereto, the improvements comprising a through hole in said reflector body, a nut portion which is coaxially movable in the through hole, a hook member formed integrally with one end face of said nut portion and extending therefrom in the axial direction, a bolt portion coacting with said nut portion and adapted to firmly press a spoke against the inside face of said hook member by virtue of the extremity of said bolt portion, a fixing means for retaining the bolt portion on its opposite side through said through hole in a state where the spoke is firmly pressed against the inside face of said hook member and the spoke is in abutting engagement with reflector, said fixing means including the bolt portion and a spring washer between the head of the bolt portion and the reflector body, and a rotation-restraining means for preventing rotation of said plate-like reflector body relative to the spokes, said rotation-restraining means comprising a groove in the reflector body, said spokes being inclined with respect to a plane through the wheel at a predetermined angle, and the axis of said through hole being perpendicular to said spoke to which the reflector body is secured.

2. A reflector for a spokewise wheel as claimed in claim 1, in which said through hole comprises an enlarged diameter portion and a reduced diameter portion, said enlarged diameter portion permitting the nut portion to be generally coaxially movable and said reduced diameter portion permitting the nut portion to be immovable.

3. A reflector for a spokewise wheel as claimed in claim 1 in which the rotation-restraining means is a groove provided in a reflective surface and said groove is inclined at said predetermined angle, such that when the reflector is mounted on said spoke, the reflective surfaces are held perpendicularly to said plane through the wheel.

* * * * *